(12) United States Patent
Ellert et al.

(10) Patent No.: US 10,744,685 B2
(45) Date of Patent: Aug. 18, 2020

(54) METHOD AND APPARATUS FOR FORMING A LEVELED SURFACE OF PASTY MASSES

(71) Applicant: Weckerle GmbH, Weilheim (DE)

(72) Inventors: Peter Ellert, Kochel am See (DE); Andreas Fink, Weilheim (DE)

(73) Assignee: WECKERLE GMBH, Weilheim (DE)

( * ) Notice: Subject to any disclaimer, the term of this patent is extended or adjusted under 35 U.S.C. 154(b) by 225 days.

(21) Appl. No.: 15/661,744

(22) Filed: Jul. 27, 2017

(65) Prior Publication Data
US 2018/0029256 A1 Feb. 1, 2018

(30) Foreign Application Priority Data

Jul. 29, 2016 (EP) .................................... 16181878

(51) Int. Cl.
| | | |
|---|---|---|
| *B29C 35/08* | (2006.01) | |
| *B23K 26/03* | (2006.01) | |
| *B23K 26/082* | (2014.01) | |
| *B23K 26/08* | (2014.01) | |
| *B23K 26/352* | (2014.01) | |
| *B29C 67/24* | (2006.01) | |
| *A45D 40/16* | (2006.01) | |
| *B29C 39/44* | (2006.01) | |

(52) U.S. Cl.
CPC .......... *B29C 35/0805* (2013.01); *A45D 40/16* (2013.01); *B23K 26/03* (2013.01); *B23K 26/082* (2015.10); *B23K 26/083* (2013.01); *B23K 26/3576* (2018.08); *B29C 39/44* (2013.01); *B29C 67/241* (2013.01); *B29C 2035/0838* (2013.01)

(58) Field of Classification Search
CPC .............. B29C 35/0805; B29C 67/241; B29C 2035/0838; B23K 26/3576; B23K 26/082; B23K 26/083; B23K 26/03; A45D 40/16
See application file for complete search history.

(56) References Cited

U.S. PATENT DOCUMENTS

| | | | |
|---|---|---|---|
| 4,172,113 | A | 10/1979 | Featherstone et al. |
| 2009/0007933 | A1* | 1/2009 | Thomas ................ B08B 7/0042 134/1 |
| 2012/0251646 | A1* | 10/2012 | Yamazaki ........ A61B 5/150022 425/129.1 |
| 2017/0135912 | A1* | 5/2017 | Perrin .................... A45D 40/16 |

FOREIGN PATENT DOCUMENTS

JP 2004010494 A * 1/2004

OTHER PUBLICATIONS

European Search Report, EPO, EP 16181878, dated Mar. 10, 2017, Machine Translation by Google Translate (Year: 2017).*

* cited by examiner

*Primary Examiner* — Michael M. Robinson
(74) *Attorney, Agent, or Firm* — Miller Canfield

(57) ABSTRACT

An apparatus and a method for forming a leveled surface of at least one pasty mass in a mold are described. Thereby, the mold is particularly adapted to mold lipstick mines, wherein the mold was filled with the pasty mass and the pasty mass was at least partially cooled in the mold. The apparatus comprises a means for at least partially melting the surface of the at least one cooled pasty mass in the mold to level the surface by heat introduction, wherein the heat introduction takes place via focused optical photo emission.

8 Claims, 3 Drawing Sheets

METHOD AND APPARATUS FOR FORMING A LEVELED SURFACE OF PASTY MASSES

PRIOR APPLICATIONS

The present application claims priority to European Patent Application No. 16181878.6 filed Jul. 29, 2016, the contents of which are included herein by reference.

TECHNICAL FIELD

The present invention generally relates to leveling a surface of at least one pasty mass. The present invention relates in particular to the leveling of a surface of at least one pasty mass in a mold for producing a lipstick mine.

BACKGROUND

In the production of lipstick mines, different waxes and additives are mixed. For this purpose, the waxes and additives are converted into a flowable state by heating prior to mixing. The mixed waxes and additives can also be referred to as pasty mass. The pasty mass is, after mixing, filled into a mold and cooled in this mold to solidify in the mold and to create a lipstick mine.

However, cooling of the pasty mass in the mold results in the problem that unevenness is formed on the surface, for example on a free surface. A free surface is in this case any surface of the pasty mass, which is not contacted by the mold or a wall of the mold. The unevenness can also be called a crater because these irregularities are usually more pronounced at the edge of the surface than in the center of the surface.

Processes and devices are known which attempt to melt the surface of the pasty mass in order to prevent a crater from forming by melting, while the remaining pasty mass cools and solidifies in the mold.

For example, U.S. Pat. No. 4,172,113 describes a device in which open molds with the pasty mass contained therein are moved under air nozzles, wherein heated air streams out of the air nozzles. The nozzles are directed vertically downwards and arranged in a row so that the molds pass through a plurality of nozzles during their movement. The nozzles are dimensioned in such a way that the heated air is specifically directed onto the surface of the pasty mass in the molds, which are just below the nozzle. This is intended to ensure that the pasty mass can remain in a flowable state on its surface after casting, while the remaining pasty mass solidifies in the mold so that the formation of a crater is prevented. However, the device shown in U.S. Pat. No. 4,172,113 is not very energy-efficient. On the one hand, a lot of energy is needed to heat the air, and on the other hand much energy is lost by the air stream. Furthermore, the apparatus has the disadvantage that the heated air stream blows the liquid mass out of the mold. This results in a clearly visible contamination of all machinery parts involved in the process.

It is therefore the object to provide a method and an apparatus, which do not have the above-mentioned disadvantages. In particular, with the method and the apparatus, the surface of the pasty mass is to be heated in the mold as energy-efficient as possible without any contamination of the machinery parts.

SUMMARY

This object is achieved by the method and apparatus according to the independent claims. Advantageous embodiments are described in the dependent claims.

The method according to the invention for forming a leveled surface of at least one pasty mass in a mold, the mold being particularly adapted to mold lipstick mines, comprises filling the mold with the pasty mass. In addition, the method comprises at least partially cooling of the pasty mass in the mold and at least partially melting the surface of the cooled pasty mass in the mold to level the surface via heat introduction, wherein the heat introduction takes place by focused optical photo emission. The melting of the surface at least partially may mean that only a certain part of the surface is melted, but it is also conceivable that the entire surface is melted. The filling of the mold with the pasty mass takes place, for example, via of a nozzle which has at least one opening from which the pasty mass can be filled into the mold in a still flowable state. The nozzle and the mold may, for example, move relatively to one another during filling. For example, the nozzle can initially be arranged at least partially in the mold, and during filling, the nozzle can be moved out of the mold by a movement of the nozzle itself or by a movement of the mold. Alternatively, the mold and the nozzle may also move simultaneously. Such a filling may also be referred to as a casting filling. During filling and/or before filling, the mold may already be heated in order to prevent the pasty mass from already solidifying when it strikes the mold. Thus, smoother surfaces may be produced. After filling the mold with the pasty mass, the mold or the pasty mass is cooled in order to accelerate the solidification of the pasty mass in the mold. This cooling of the pasty mass may be a controlled, i.e. regulated, cooled. For example, the form may be circumvented or circulated directly or indirectly by a heat transfer medium in order to cool the mold and thus the pasty mass present therein. The heat transfer medium may be air or water or another carrier. The cooling may be controlled in such a way that this is adapted to the composition of the pasty mass. The cooling-solidification process may be controlled via the temperature of the heat transfer medium. For example, the temperature of the heat transfer medium may be successively reduced over a certain time.

When the mold cools, the pasty mass in the mold also cools, which begins to solidify. Thereby, it experiences shrinkage. The reason for this is the thermal contraction of the pasty mass during its cooling and solidification, which is generally caused by the thermal expansion of each substance. Due to the shrinkage of the pasty mass, a solidification crater forms on the surface of the pasty mass. The surface can be a surface which does not contact the mold.

The formation of the solidification crater causes unevenness on the surface of the pasty mass, which adversely affects the process quality during lipstick production. For example, it may make the removal of the hardened pasty mass from the mold, for example a flexible mold, more difficult in the further process course of the lipstick production. This unevenness can be remedied according to the invention by melting and leveling the surface of the pasty mass. In this case, the surface of the pasty mass is at least partially or completely melted by means of a heat introduction, while the remaining pasty mass solidifies in the mold. The melting means that the pasty mass is again transferred into a flowable state, i.e. the pasty mass is again in a state in which it can distribute itself independently over the surface or at least a part of the surface. As a result, the pasty mass automatically takes on a uniform level. It may thus be said that the pasty mass becomes uniformly flat on the surface by the melting. According to the invention, the heat introduction for melting takes place by means of focused optical photo emission, which is provided, for example, by a laser.

In contrast to the methods known from the prior art, the use of a focused optical photo emission makes possible a more targeted and more energy efficient leveling of the surface.

The method according to the invention and the device according to the invention provide for the first time a method and a device with which the surface of a cooled pasty mass in a mold can be melted and leveled in a targeted and energy efficient manner by heat introduction in order to counteract the forming of a crater on the surface of the pasty mass.

In a preferred embodiment of the method according to the invention, the heat introduction is controlled. By ease of the control, the heat introduction may, for example, be individually adapted for each individual surface. It is therefore possible to process each surface individually, so that optimal results can be achieved. The control of the heat introduction may be a change in the direction of the focused optical photo emission. The change in direction of the focused optical photo emission can be used to irradiate different regions of the surface of the pasty mass and thus to melt regions of the surface in a targeted manner. If, for example, the surface differs in a region from a flat surface, so that there is unevenness in a region, the focused optical photo emission may be directed specifically there to melt these regions and the pasty mass accumulated there. In the case of the solidification crater, the unevenness may be found, for example, at the edge of the mold. On the other hand, if the irregularities are irregularly distributed on the surface, then these irregular irregularities can also be irradiated specifically by means of the focused optical photo emission. The change in the direction of the focused optical photo emission may not follow a pattern or may follow a specific pattern. For example, if the surface repeatedly deviates from a flat surface in certain areas, the direction of the focused optical photo emission may follow a pattern and be used and repeated for several surfaces. In this case, it may also be said that the change in the direction of the focused optical photo emission follows an adaptive pattern, the pattern being learned and being statistically adjusted over the melting of several surfaces. However, the pattern may also be a predetermined pattern, such as a helical pattern or concentric rings, etc. For example, a pattern, which allows a uniform heat introduction, may be selected. In this case, each region of the surface is, for example, irradiated for the same time, that is, the pattern ensures that the focused optical photo emission always hits the area of the surface for the same time. Various patterns are known to the person skilled in the art which permit a uniform heat introduction. However, it is also conceivable that the direction of the focused optical photo emission is always only changed in such a way that the edge of the surface is melted. The pattern may thus be designed according to the design, i.e. the geometric configuration, the surface, that is, depending on the opening in the mold through which the mold is filled. However, it is also conceivable that the direction of the focused optical photo emission is changed individually for each surface to be melted. In this case, it may be said that the change in direction of the focused optical photo emission is freely chosen and does not follow any particular pattern.

The control of the heat introduction may also, or alternatively, be a regulation of the energy of the focused optical photo emission. The focused optical photo emission has a high energy density, the intensity of which may rapidly reach a range in which the surface of the irradiated pasty mass is no longer molten, but is damaged by the high energy of the incident radiation. Damage to the surface may be manifested by burning the surface of the irradiated pasty mass at the point where the radiation is incident. It is also possible for the pasty mass to be blown out at the point where the radiation impacts. The energy may therefore, for example, be regulated in such a way that the pasty mass melts as quickly as possible but is not damaged. In this case, for example, the power of the focused optical photo emission may be adapted, which allows, for example, the use of lasers in different power stages as a source of the focused optical photo emission. The regulation of the energy of the focused optical photo emission may also be used to adjust the energy to various pasty masses, which consist, for example, of different waxes and additives. Furthermore, the regulation of the energy of the focused optical photo emission may be used to control the penetration depth of the incident focused optical photo emission in the irradiated pasty mass. It is thereby regulated, for example, how much volume of the pasty mass is melted. It is also conceivable that the process time may be controlled by controlling the energy of the focused optical photo emission.

A further preferred embodiment of the method according to the invention comprises determining a first degree of evenness of the surface of the pasty mass before the melting and starting the melting of the surface when the first degree of evenness reaches a first threshold. For the determination of the degree of evenness of the surface, this is scanned by means of a sensor. The sensor may in this case, for example, emit radiation independently and receive the reflection from the surface, by means of which the unevenness of the surface may be determined. The sensor may also use the reflection of the focused optical photo emission itself and picks up the latter to determine the unevenness of the surface. It is also conceivable for the sensor to emit acoustic waves and to record the reflection from the surface, by means of which the unevenness of the surface may be determined. The sensor may also make an image of the surface and a computer may use the image to determine the first degree of evenness of the surface. By determining the degree of evenness of the surface, it is possible to make the melting of the surface individually dependent upon the unevenness. In the case where the surface has a degree of evenness which is outside a defined threshold, the melting of the surface may be exposed, for example, as a result of which the process duration during lipstick production may be shortened. The first threshold can be in the range from 5 mm to 25 mm (0.2 in to 1 in). Therefore, measurement points on the surface should have a height difference within this range. If the height difference of at least two measuring points has a value which is greater than the defined range, the surface is uneven and the melting is started.

A further preferred embodiment of the method according to the invention comprises determining a second degree of the evenness of the surface of the pasty mass during melting and the termination of the melting of the surface when the second degree of evenness reaches a second threshold. The second degree of evenness of the surface is also determined by means of a sensor. As soon as the sensor detects a leveled surface, i.e. the unevenness has reached a level which is tolerable, the melting is stopped. Thus, the duration of the melting may be controlled in a targeted manner, which has a positive effect on the process duration during lipstick production. For determining the degree of evenness of the surface under consideration, the surface may first be scanned with a defined resolution from the sensor. The resolution determines the number of measuring points recorded per unit of area. The surface scanned by the sensor may comprise the entire surface area of the pasty mass in the mold or the sensor scans only a partial area of the surface of the pasty mass in the mold. The sensor provides a value for each of the measuring points, which, for example, represents the distance of the measuring point from the sensor. The location of each measurement point and the value associated with each of the measurement points are stored. This results in a height profile which reflects the shape deviation of the scanned actual surface from an ideally smooth surface. Based on the measured values at the measuring points which, for example, represent the distance between the measurement points from the sensor, an averaged value of the distance of the scanned surface from the sensor can be determined, which maps the desired height of the surface of the pasty mass in the mold. This averaged value can be, for example, the arithmetic mean value of the measured values. Further mathematical methods for the determination of mean values are known to the person skilled in the art which may also be used in the embodiments shown herein. The degree of evenness of the scanned surface may be determined, for example, by determining the number of measured values deviating from the ascertained mean value. The difference between the number of deviating measured values and the number of all measured values may represent a degree of evenness. It is also conceivable that in addition to the pure number of deviating measured values, also the magnitude of each measured value be included in the calculation of the degree of evenness. It can be said that, in this case, each measured value is weighted by its magnitude in the calculation of the degree of evenness. Other methods for the determination of the evenness of surfaces which can be used in the embodiments shown here are also known to the person skilled in the art.

The above-mentioned object is also achieved by a device for forming a leveled surface of at least one pasty mass in a mold, the mold being particularly adapted for molding lipstick mines, the mold being filled with the pasty mass and the pasty mass is at least partially cooled in the mold. The device comprises a means for at least partially melting of the surface of the at least one cooled pasty mass in the mold for leveling the surface by heat introduction, wherein the heat introduction takes place by ease of focused optical photo emission. In this case, the means for melting may be a laser which emits the focused optical photo emission. For example, a fiber laser may be used. This may emit radiation with a wavelength of 980 nm±10 nm at a power density of $8.5 \times 10^5$ W/cm$^2$ ($1.3 \times 10^5$ W/square inch). The person skilled in the art is aware that other lasers or other means for focused photo emission may also be used to produce a focused heat introduction in a pasty mass.

In a preferred embodiment, the device comprises a means for controlling the heat introduction. The means for controlling in particular controls the means for melting. For example, the means for controlling may change the direction of the focused optical photo emission. For this purpose, the means for controlling may, for example, comprise a movable optical system or a movable mirror with which the direction of the focused optical photo emission may be changed. The mirror used may, for example, comprise a coating adapted to the wavelength of the laser beam. For example, a prism may also be used, which is manufactured on the basis of the selection of substrates, coatings or a combination of substrates and coatings in order to obtain a high reflection in a certain wavelength range. Such prisms are provided for the internal reflection of a focused optical photo emission on several surfaces in order to deflect the focused optical photo emission. Alternatively or additionally, the means for controlling can also move the entire means for melting and thus change the direction of the focused optical photo emission. The means for controlling may in this case be a galvo scanner which, for example, moves the optical system for directing the focused optical photo emission. Alternatively, the means for controlling may move the means for melting itself. A galvo scanner is a highly dynamic rotary drive, which takes a certain angle of rotation as a function of a time duration of an applied voltage.

The means for controlling may also control the energy of the focused optical photo emission striking the surface of the pasty mass in the mold. For example, the means for controlling may regulate the permeability, i.e. the opacity, of a material through which the focused optical photo emission is transmitted to control the energy of the focused optical photo emission striking the surface of the pasty mass in the mold. Alternatively or additionally, different filters may also be used to control the energy of the focused optical photo emission. It is also conceivable that the means for melting itself can control the energy with which the focused optical photo emission leaves the means.

In a further preferred embodiment, the device according to the invention comprises a means for determining a first degree of the evenness of the surface of the pasty mass before the melting, the means for melting being adapted to start the melting of the surface when the first degree of evenness reaches a first threshold. In this case, the means for determining a first degree of evenness may be a sensor which scans the surface and determines its unevenness. As a sensor, for example, a surface-scanning laser displacement sensor may be used, which evaluates the reflection of a laser light point focused on the measuring surface. The sensor precisely measures the distance to the surface, whereby the measuring accuracy is not affected either by the composition of the pasty mass, or by the color or the viewing angle.

In a further preferred embodiment, the device according to the invention comprises means for determining a second degree of evenness of the surface during melting, the means for melting being adapted to terminate the melting of the surface when the second degree of evenness reaches a second threshold.

BRIEF DESCRIPTION OF THE DRAWINGS

The invention is explained in more detail below with reference to exemplary embodiments with the accompanying drawings. Further details, features and advantages of the subject matter of the invention may be gathered from the described exemplary embodiments. It shows.

DETAILED DESCRIPTION

Figure 1:
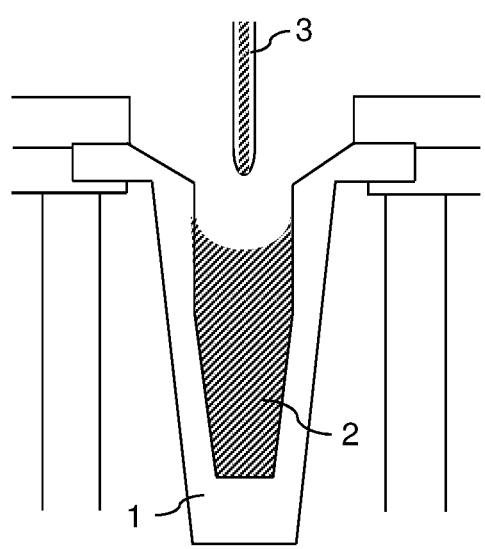
FIG. 1 a vertical slice through an exemplary mold filled with a pasty mass with solidification crater.

FIG. 1 shows schematically, using a vertical slice through a mold 1, the filling of the mold 1 with a pasty mass 2 by means of a nozzle 3 and the subsequent cooling of the mold 1 with the pasty mass 2 contained therein, which is shown in the exemplary embodiment shown here as a shaded surface. The mold 1 may, for example, be a flexible mold 1. The mold 1 may be filled via the nozzle 3. In this case, the nozzle 3 may initially be at least partially arranged in the mold 1 and, when the mold 1 is filled, may be moved out of the mold 1. The moving out may thereby be accomplished by a relative movement of the mold 1 and the nozzle 3. Here, pasty mass 2, which is in the flexible form 1, has already begun to cool and solidify, and it can be seen that a solidification crater has formed on the surface of the pasty mass 2 in the mold 1 which is open at the top. In the exemplary embodiment shown here, the solidification crater has formed on the free surface of the pasty mass 2, i.e. on a surface which is not contacted by a wall of the mold 1. The solidification crater is indicated by the curvature of the shaded surface. A characteristic feature of the solidification crater becomes clear. It can be seen that the pasty mass 2 is lowered in the middle region of its surface in the mold 1 which is open at the top, and that the pasty mass 2 thus has flanks rising towards the edges.

Figure 2:
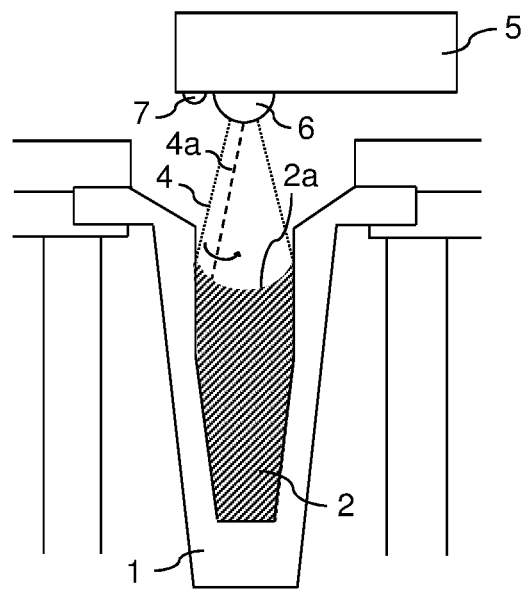
FIG. 2 the exemplary mold shown in FIG. 1 with an embodiment of the apparatus according to the invention before starting the melting of the surface of the pasty mass in the mold.
Figure 3:
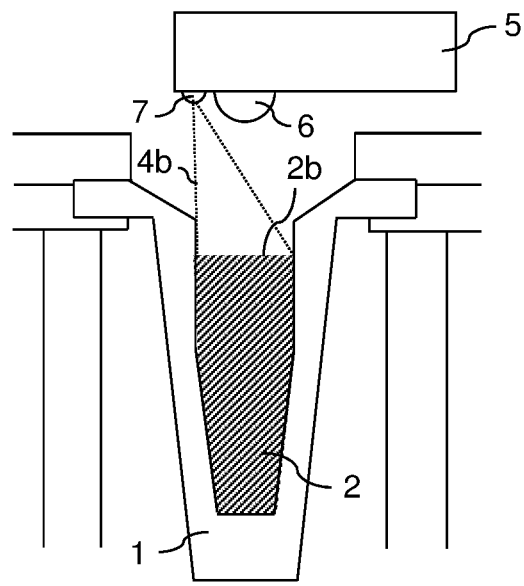
FIG. 3 the exemplary mold shown in FIG. 1 with the embodiment of the apparatus according to the invention shown in FIG. 2 after the melting and leveling the surface of the pasty mass in the mold.

FIG. 2 again shows the vertical slice through the mold 1 with the pasty mass 2 and the solidification crater shown in FIG. 1. Furthermore, FIG. 2 shows an exemplary means for melting 5 of the surface 2a of the pasty mass 2. In the exemplary embodiment shown here, the means for melting 5 is a laser unit, which preferably comprises a fiber laser—not shown here. The laser unit 5 generates a laser beam 4a. This laser beam 4a is a focused optical photo emission. The direction of the laser beam 4a in the exemplary embodiment shown may be changed or controlled within the sector 4. The laser beam 4a may be moved within the sector 4, which is shown as a truncated cone in the exemplary embodiment shown here. For this purpose, the laser unit 5 has a means for controlling 6. This means for controlling 6 may be a galvo scanner which moves an optical system, for example a filter-coated mirror or a prism—not shown here—for directing the laser beam 4a. The galvo scanner 6 is adapted in such a way that the laser beam 4a may move within the sector 4. The sector 4 is designed in such a way that it may cover the entire surface 2a of the pasty mass 2. If the laser beam 4a strikes the pasty mass 2 at the surface 2a, the laser beam 4a causes a heat introduction into the pasty mass 2. By ease of this heat introduction the pasty mass 2 is melted at the surface 2a, i.e. it is again transferred into a flowable state. The flowable pasty mass 2 may then distribute and level, that is, the surface 2a is leveled. This is shown in FIG. 3, where the solidification crater has dissolved and the surface 2a has spread to a leveled surface 2b. In this case, the sensor 7 scans the upwardly free surface 2a, 2b of the pasty mass 2 in the mold 1, and in doing so considers the entire surface 2a, 2b of the pasty mass 2, which is located within the cone 4b. It is known to a person skilled in the art that the amount of the molten pasty mass 2 depends on the energy introduction of the laser beam 4a and its dwell time at one location. The dwell time may thereby be controlled by the galvo scanner 6, which can move the laser beam 4a over the surface 2a in a specific pattern. For example, the laser beam 4a is moved such that the laser beam 4a starts to melt in the middle of the mold 1, i.e. in the center of the surface that is at the lowest point of the solidification crater and is then moved concentrically outwards to the edge of the mold 1. In this way it is prevented that deep solidification craters are only closed and shrink hole formation—cavity formation—occurs. Furthermore, the laser unit 5 may comprise a means—not shown here—which controls the output energy of the laser beam 4a.

In the exemplary embodiment shown here, the laser unit 5 also comprises a means for determining the evenness of the surface 2a. This means may be a sensor which may optically or acoustically determine the degree of evenness of the surface 2a so as to regulate the galvo scanner 6 to direct the laser beam 4a such that the laser beam 4a strikes areas in which the degree of evenness is the worst. For this purpose, the sensor 7 may be an active sensor 7, i.e. the sensor 7 may itself emit a signal whose reflection is determined in order to determine the degree of evenness. Alternatively, the sensor 7 may be a passive sensor 7 which uses the reflection of the laser beam 4a to determine the degree of evenness.

The sensor 7 may output one or more output values to a microcontroller—not shown here—of the laser unit 5. With this one or more output values, the microcontroller may determine whether the melting is to be continued and if the output values allow a representation of the degree of the evenness over the surface 2a, then the microcontroller may also direct the galvo scanner 6 to the laser beam 4a to move to certain positions. Alternatively or additionally, such a control may also be accomplished by a computer—not shown here—connected to the laser unit 5. The sensor 7 may also determine when the degree of evenness has reached a value at which no further melting is necessary. In this case, the sensor 7 may indicate that the laser unit 5 shall stop the melting. In this case, the laser of the laser unit 5 is switched off or the laser beam 4a is at least deflected or blocked in such a way that it no longer strikes the surface 2a. A leveled surface is shown in FIG. 3. Here, the surface 2b has taken a uniform level, i.e. the surface 2b is smoothed and the laser beam 4a is turned off.

In the exemplary embodiment of the device according to the invention shown in FIGS. 2 and 3, the laser beam 4a of the laser unit 5 has been moved with the aid of a galvo scanner 6 and may thus cover the sector 4.

Figure 4:
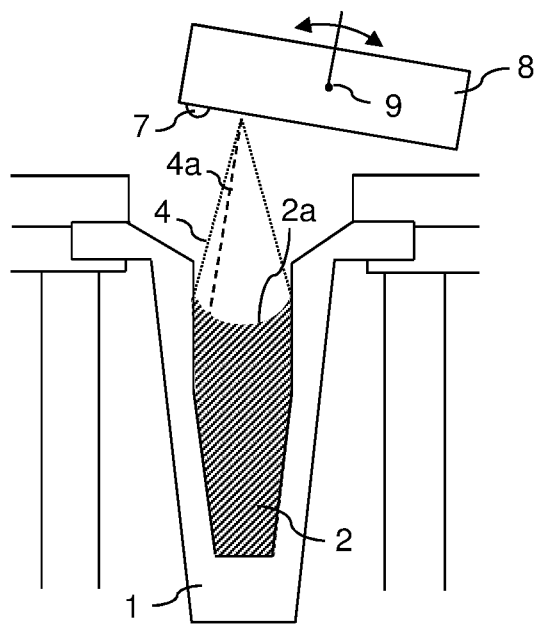
FIG. 4 the exemplary embodiment shown in FIG. 1 with an embodiment of an apparatus according to the invention in a movable embodiment before starting the melting of the surface of the pasty mass in the mold.
Figure 5:
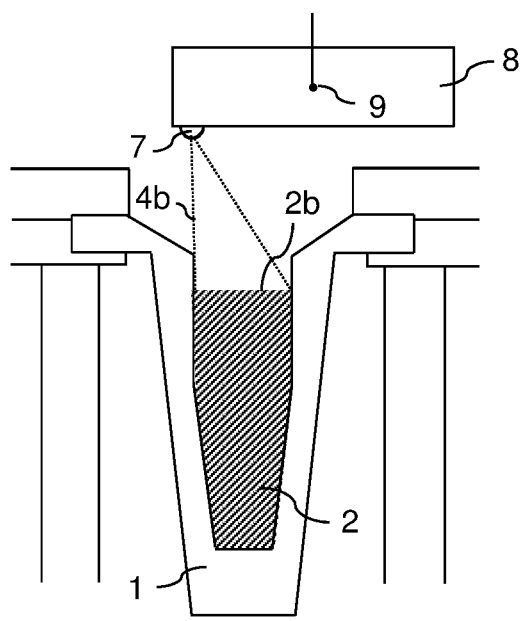
FIG. 5 the exemplary embodiment shown in FIG. 1 with the embodiment of the apparatus according to the invention shown in FIG. 4 after the melting and the leveling of the pasty mass in the mold.

However, it is also conceivable that the laser beam 4a itself is not moved but the complete laser unit 8. This is shown in FIGS. 4 and 5. Here, the laser unit 8 is moved, for example, by ease of a moving means 9. This moving means 9 may be a galvometer or stepping motor or the like and is located in or on the laser unit 8. The control of the means for moving 9 may, according to the galvo scanner 6 of FIGS. 2 and 3, take place by ease of a sensor 7 which maps the unevenness on the surface 2a and supplies it to a microcontroller or computer—not shown here—so that the means for moving 9 of the control unit 8 may be correspondingly controlled. In this case, the sensor 7 also scans the upwardly free surface 2a, 2b of the pasty mass 2 in the mold 1 and thereby considers the entire surface 2a, 2b of the pasty mass 2, which is located within the cone 4b.

It will be understood by those skilled in the art that the exemplary embodiments shown are only exemplary and all elements, modules, components, participants and units shown may be differently designed, but nevertheless may fulfill the basic functionalities described here.

The invention claimed is:

1. An apparatus for forming a leveled surface of at least one pasty mass in a mold, wherein the mold is particularly adapted to mold lipstick mines, and the mold is configured to be filled with the pasty mass and configured for the pasty mass to be at least partially cooled, the apparatus comprising:

means for at least partially melting the surface of the at least one cooled pasty mass in the mold to level the surface by heat introduction, wherein the heat introduction takes place via focused optical photo emission and;

a sensor for determining the evenness of the surface that cooperates with the means for melting the surface.

2. The apparatus according to claim 1, wherein the means for melting is a laser, particularly a fiber laser.

3. The apparatus according to claim 1, further comprising:
a means for controlling the heat introduction.

4. The apparatus according to claim 3, wherein the means for controlling the heat introduction changes the direction of the focused optical photo emission.

5. The apparatus according to claim 4, wherein the means for controlling is a galvo scanner, which moves an optical system for directing the focused optical photo emission or the means for controlling moves the means for melting.

6. The apparatus according to claim 3, wherein the means for controlling the heat introduction regulates the energy of the focused optical photo emission.

7. The apparatus according to claim 1, wherein:
the sensor determines a first degree of evenness of the surface of the pasty mass before the melting of the pasty mass; and
wherein the means for melting is adapted to start the melting of the surface, when a first degree of evenness of the surface reaches a first threshold.

8. The apparatus according to claim 7, wherein:
the sensor also determines a second degree of evenness of the surface of the pasty mass during the melting of the pasty mass; and
wherein the means for melting is adapted to finish melting the surface, when a second degree of evenness of the surface reaches a second threshold.

* * * * *